United States Patent
Kamimura

(10) Patent No.: US 8,171,003 B2
(45) Date of Patent: May 1, 2012

(54) METHOD AND APPARATUS FOR CHANGING REFERENCE OF DATABASE

(76) Inventor: Kunio Kamimura, Koganei (JP)

( * ) Notice: Subject to any disclaimer, the term of this patent is extended or adjusted under 35 U.S.C. 154(b) by 0 days.

(21) Appl. No.: 12/688,854

(22) Filed: Jan. 15, 2010

(65) Prior Publication Data

US 2010/0131479 A1 May 27, 2010

Related U.S. Application Data

(63) Continuation-in-part of application No. 12/601,005, filed as application No. PCT/JP2008/001424 on Jun. 4, 2008.

(30) Foreign Application Priority Data

| Jun. 6, 2007 | (JP) | 2007-150665 |
| Jun. 4, 2008 | (WO) | PCT/JP2008/001424 |
| Jun. 12, 2008 | (WO) | PCT/JP2008/001506 |
| Jun. 3, 2009 | (WO) | PCT/JP2009/002490 |
| Jun. 3, 2009 | (WO) | PCT/JP2009/002491 |

(51) Int. Cl.
*G06F 7/00* (2006.01)
*G06F 17/30* (2006.01)
*G06F 12/00* (2006.01)

(52) U.S. Cl. ........................ 707/694; 707/813

(58) Field of Classification Search .................. 707/690, 707/694, 687, 813–820, 999.2, 999.201, 707/999.205, 999.206, 999.1, 999.101
See application file for complete search history.

(56) References Cited

U.S. PATENT DOCUMENTS

| 5,325,496 A | 6/1994 | Hays et al. |
| 5,504,879 A * | 4/1996 | Eisenberg et al. ............. 1/1 |
| 5,870,765 A | 2/1999 | Bauer et al. |
| 5,884,325 A | 3/1999 | Bauer et al. |
| 5,890,176 A | 3/1999 | Kish et al. |
| 5,926,816 A | 7/1999 | Bauer et al. |
| 6,088,694 A * | 7/2000 | Burns et al. ............. 1/1 |
| 6,151,606 A | 11/2000 | Mendez |
| 6,343,299 B1 | 1/2002 | Huang et al. |

(Continued)

FOREIGN PATENT DOCUMENTS

JP S61-134853 A 6/1986

(Continued)

OTHER PUBLICATIONS

Athena Telecom Lab, Inc., "New developing project spreading over the world", web contents referenced from http://www.atele.com, uploaded from Mar. 9, 2009 to Apr. 23, 2009.

(Continued)

*Primary Examiner* — Brent Stace

(57) ABSTRACT

Introduced is information that indicates a changing of "a reference that points a referenced record" to "another reference that points another record". This information is named as "changing reference information (CRI)" and is registered to a referred record. When accessing a referencing record, there is a possibility to access referenced record by necessity of a program or an operator. At this time, CRI registered to originally referenced record is accessed. And the reference is changed to new record as indicated by the CRI. Thus, status of a DB in a device is changed by the invention. When PCs have reproduced DBs that are copy of the original and edit their own reproduced DBs so as to change a reference, these editorial contents with CRI will be propagated to other PCs. Other PCs change references of their reproduced DBs according to the CRIs.

9 Claims, 7 Drawing Sheets

U.S. PATENT DOCUMENTS

| | | | |
|---|---|---|---|
| 6,571,250 B1* | 5/2003 | Hara | 1/1 |
| 6,668,260 B2 | 12/2003 | Zoltan | |
| 6,701,345 B1 | 3/2004 | Carley et al. | |
| 6,874,001 B2 | 3/2005 | Narang et al. | |
| 6,892,210 B1 | 5/2005 | Erickson et al. | |
| 7,058,664 B1 | 6/2006 | Hsu | |
| 7,177,866 B2 | 2/2007 | Holenstein et al. | |
| 7,213,037 B2 | 5/2007 | Rangadass | |
| 7,308,448 B1 | 12/2007 | Martin | |
| 7,403,945 B2 | 7/2008 | Lin et al. | |
| 7,415,467 B2 | 8/2008 | Jeevanjee et al. | |
| 7,512,636 B2* | 3/2009 | Verma et al. | 1/1 |
| 2005/0198079 A1 | 9/2005 | Heeb | |
| 2008/0059469 A1* | 3/2008 | Pruet | 707/8 |
| 2008/0172429 A1* | 7/2008 | Lin et al. | 707/205 |

FOREIGN PATENT DOCUMENTS

| | | |
|---|---|---|
| JP | S62-57070 | 3/1987 |
| JP | H03-256146 | 11/1991 |
| JP | H05-189284 | 7/1993 |
| JP | H05-204727 A | 8/1993 |
| JP | H05-233405 | 9/1993 |
| JP | H09-91184 A | 4/1997 |
| JP | H10-198589 A | 7/1998 |
| JP | A H11-3368 | 1/1999 |
| JP | H11-219309 | 8/1999 |
| JP | H11-219309 A | 8/1999 |
| JP | H11-272533 | 10/1999 |
| JP | 2000-20370 | 1/2000 |
| JP | 2000-132603 A | 5/2000 |
| JP | 2000-194592 | 7/2000 |
| JP | 2000-284998 A | 10/2000 |
| JP | 2000-339211 A | 12/2000 |
| JP | 2002-32248 A | 1/2002 |
| JP | 2002-244907 | 8/2002 |
| JP | 2002-244907 A | 8/2002 |
| JP | 2003-122509 | 4/2003 |
| JP | 2003-256258 | 9/2003 |
| JP | 2004-13367 | 1/2004 |
| JP | 2004-13867 A | 1/2004 |
| JP | 2004-86800 A | 3/2004 |
| JP | 2005-63374 | 3/2005 |
| WO | PCT/JP08/001506 A | 6/2008 |
| WO | PCT/JP08/001424 A | 12/2008 |
| WO | PCT/JP09/002490 | 6/2009 |
| WO | PCT/JP09/002491 | 6/2009 |

OTHER PUBLICATIONS

Athena Telecom Lab, Inc., "New developing project spreading over the world", web contents referenced from http://www.atele.com, uploaded from Oct. 7, 2009 to Jan. 6, 2010.

Nakamura Motonori, Others "Evaluation of Duplication Management System in Adaptive On-line Storage System" Especially, p. 33, Section 3.2 "Administrative system", and Fig.2.

Nakamura, etc. "Evaluation of Duplication Management System in Adaptive On-line Storage System" (Sec3.2, FIG2), IPSJ SIG Tech. Rep., Dec. 14, 2002, p. 31-36, 2002-AVM-38-6, Tokyo.

Nakamura, etc. "Evasluation of Duplication System in Adaptive On-line Storage System" IPSJ SIG Tech. Rep., Nov. 14, 2002, AVM38-6, Tokyo.

P.A.Bernstein etc, Concurrency controll and recovery in database systems, 1987, Addison-wesley. (Note: Someone may say that Section 4 of p. 113-138 relates to the application).

Maurice Herlihy et al. "Software Transactional Memory for Dynamic-Sized Data Structures", Jul. 2003, Annual ACM Symposium on Principles of Distributed Computing Proceedings.

Kemme et al., A New Approach to Developing and Implementing Eager Database Replication Protocols, Swiss Federal Institute of Technology, ACM Transactions on Database Systems.

Birman, K., Schiper, A., and Stephenson, P. 1991. Lightweight causal and atomic group multicast. ACM Trans. Comput. Syst. 9, 3(Aug.), 272-314.

Moser, L. E., Melliar-Smith, P. M., Agarwal, D. A., Budhia, R. K., and Lingley-Paradopou-Los, C. A. 1996. Totem: a fault-tolerant multicast group communication system. Commun.

* cited by examiner

US 8,171,003 B2

METHOD AND APPARATUS FOR CHANGING REFERENCE OF DATABASE

CROSS-REFERENCE TO RELATED APPLICATIONS

This application is a continuation-in-part of U.S. application Ser. No. 12/601,005 filed Apr. 13, 2010 that is U.S. National stage of PCT/JP2008/001424 filed on 4 Jun. 2008, which claims the priority of JP 2007-150665 filed on 6 Jun. 2007. These three applications are herein incorporated by reference entirely.

The following pending and US designating PCT applications relate to the present application, and incorporated by reference herein their entirely: PCT/JP2008/001506 filed at 12 Jun. 2008, PCT/JP2009/002490 and PCT/JP2009/002491 filed at 3 Jun. 2009. This application claims benefit of these earlier filing dates.

U.S. Pat. No. 6,526,455 filed at 4 Aug. 1998 and granted at 25 Feb. 2003 before USPTO is relate to the present application, and incorporated by reference herein entirely.

BACKGROUND OF THE INVENTION

Information contained in a database (DB) is a collection of records. Some of them have references to other records. Reference is an expression of a relation among records and is a common concept on various kinds of DBs. Some DBs have referential integrity functions, such as "chain deleting" or "chain updating". These functions delete or update other records in consequence of a deletion or modification of a record. However, it forces to consume processing power of PC to prevent referential inconsistency for each operation to DB. The present invention resolves this problem.

There is another technical back ground view of the present invention. As a method for sharing one DB among PCs, each PC has reproduced DB that is a copy of the original. Each PC can access to its own reproduced DB individually. Lock mechanism can be used to prevent inconsistency among reproduced DBs of all PCs. Before editing a reproduced DB, PC asks other PCs not to edit their reproduced DBs concurrently. Finishing editing work, the editing contents are propagated to other PCs and locks are released. Apparently this method restricts concurrent editing accesses to reproduced DBs and decreases merits of introducing reproduced DBs.

If concurrent editing works are allowed for PCs and every editing work are propagated to others asynchronously, there will be a structural inconsistency of DB. For example, record referred by other records may be deleted or modified in another reproduced DB, because there is no investigation on other DBs before the editing works. Such inconsistencies will be spread over PCs, by propagating editorial contents to other reproduced DBs asynchronously. The present invention also resolves this problem.

SUMMARY OF THE INVENTION

Introduced is information that indicates a changing of "a reference that points a referenced record" to "another reference that points another record". This information is registered to a referenced record and is named as "changing reference information (CRI)" in this description. When accessing a referencing record, there is a possibility to access referenced record depending on a necessity of a program or an operator. At this time, CRI registered to originally referenced record is accessed. And reference to the original record is changed to new record as indicated by the CRI. Thus, smoothed is the peak processing burden keeping referential integrity for each operation on DB.

The present invention also resolves inconsistency of reference caused by concurrent editing work on reproduced DBs. When a PC edits its own reproduced DB so as to change a reference, CRI for this changing will be created. CRI or editorial contents containing CRI will be propagated to other PCs. Each of them set the CRI to record specified and changes reference according to the CRI as mentioned above.

The present invention can be operated as programs on computers or can be implemented as an apparatus. It is possible that some parts of this apparatus are implemented on devices of other apparatus that receives signals from another apparatus and send back resultant signals. Status of a DB in a device will be changed by the present invention.

DETAILED DESCRIPTION OF THE INVENTION

Section 1

Basic Implementations

<1.1 Simple Changing>

Figure 1:
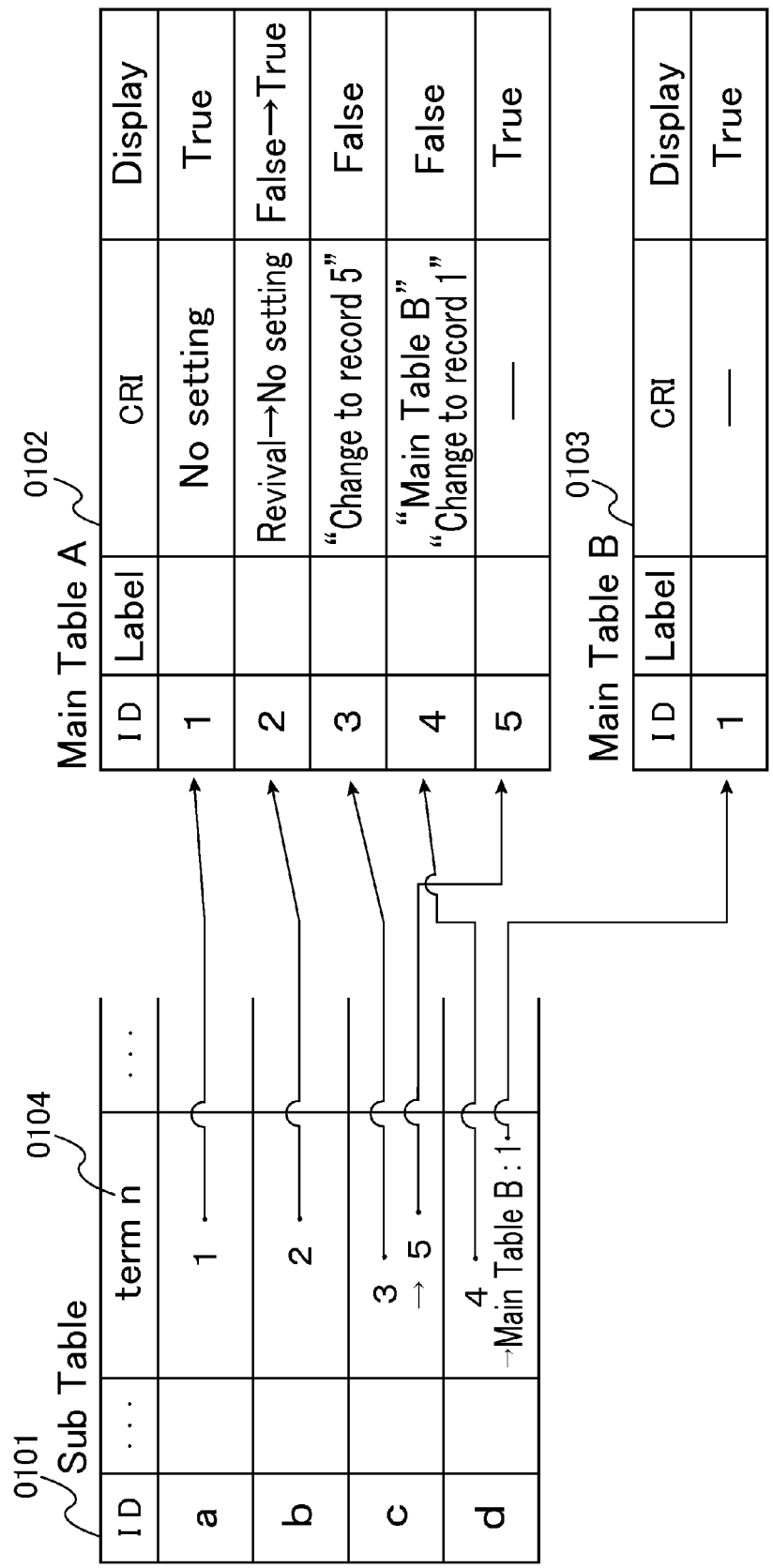
FIG. 1 shows changing reference by CRI.

For changing a reference, CRI is created and registered to the referenced record. FIG. 1 illustrates this situation. At the initial, term n 0104 of record "ID=c" in sub table 0101 refers record "ID=3" of main table A 0102. CRI registered to this record is "Change to record 5". In this figure, CRI is shown as a value of the third term of main table A 0102. As another implementation, it is possible to use supplementary table to show mapping of referenced records and CRIs by one of popular dictionary mechanisms.

When term n 0104 of record "ID=c" in sub table 0101 is accessed, referenced record "ID=3" of main table A 0102 will be accessed. And, CRI registered to this record is accessed. Reference from term n 0104 of record "ID=c" of sub table 0101 will be changed to record "ID=5" of main table A 0102, according to the CRI of "Change to record 5".

<1.2 Access to a Record>

Any embodiment of DB provides access method to a record, which is a handle or a pointer to a record or a method to read or write contents. If a table is already specified for a program or there is only one table, ID of record is enough as a specification of record to be accessed. If there are plural tables, combined data with "specification of table" and "specification of record" can specify a record. If there are plural DBs to be treated, combined data with "specification of DB", "specification of table" and "specification of record" can specify a record. These combinations of identifications and procedure to get the targeted objects, which are records in this description, are discussed in U.S. Pat. No. 6,526,455.

<1.3 Changing Reference to Another Table>

When term n 0104 of record "ID=d" in sub table 0101 is accessed, referenced record "ID=4" of main table A 0102 is also accessed. At this time, CRI registered to this record is accessed. And reference from record "ID=d" in sub table 0101 is changed to record "ID=1" of main table B 0103, according to the CRI of "Main table B" and "Change to record 1".

If there is only one DB to be treated, typical CRI can be consisting of "Table S" (S is sample table name for explanation)+"Record Y" (Y is sample ID: major key for explanation). This indicates to change reference to record Y in table S.

<1.4 Preventing Circulation of Reference Changing in a Table>

If there are many changing at table A 0102, infinite circulations of changing may occur. It can be prevented by using changing reference to another table. Beside main table A 0102, new main table such as table B 0103 is introduced. If all CRIs of table A indicate changing reference to records of table B as shown for record "ID=4" of main table A 0102, there will be no circulation of reference changing.

For concise explanation by FIG. 1, term n 0104 of sub table 0104 refers records of main table A 0102 and main table B 0103. However, most of current DBs embodiments employ restriction that only one main table is referred by one term (column) of a sub table. It is practical to introduce a restriction that one term (column) of table refers only new main table for usual operations, and the former main table should only be accessed by a program base on the present invention for changing a reference.

<2.1 No Changing>

When term n 0104 of record "ID=a" in sub table 0101 is accessed, referenced record "ID=1" of main table A 0102 is also accessed. There will be no change of reference from record "ID=a", because CRI is not registered to this record or CRI of "no setting" is registered.

<2.2 Revival of Record>

In FIG. 1, "display=False" is a mark showing deleted status of this record. If a record is not displayed on a screen, or not to be accessed by user programs, it is equal to be deleted for them. In main table A 0102, records with ID=2, 3, and 4 are in deleted status (display=False). When accessing a record "ID=b" of sub table 0101, "display=True" is set for record ID=2 of main table A 0102, because "Revival" is detected while checking the CRI. After revival work is done, CRI of "revival" is changed to "no setting."

<2.3 Changing Reference Logic>

When CRI is "another record of the same table"+"changing reference logic L" (L is a sample label of logic for explanation), or when CRI is "record of another table"+"changing reference logic L", procedure of changing reference is explained as follow. Here "logic" means process to get new referenced record. When this record of the main table is referred from a sub table, logic specified by L is invoked. Result of logic L shows a new referenced record.

Figure 2:
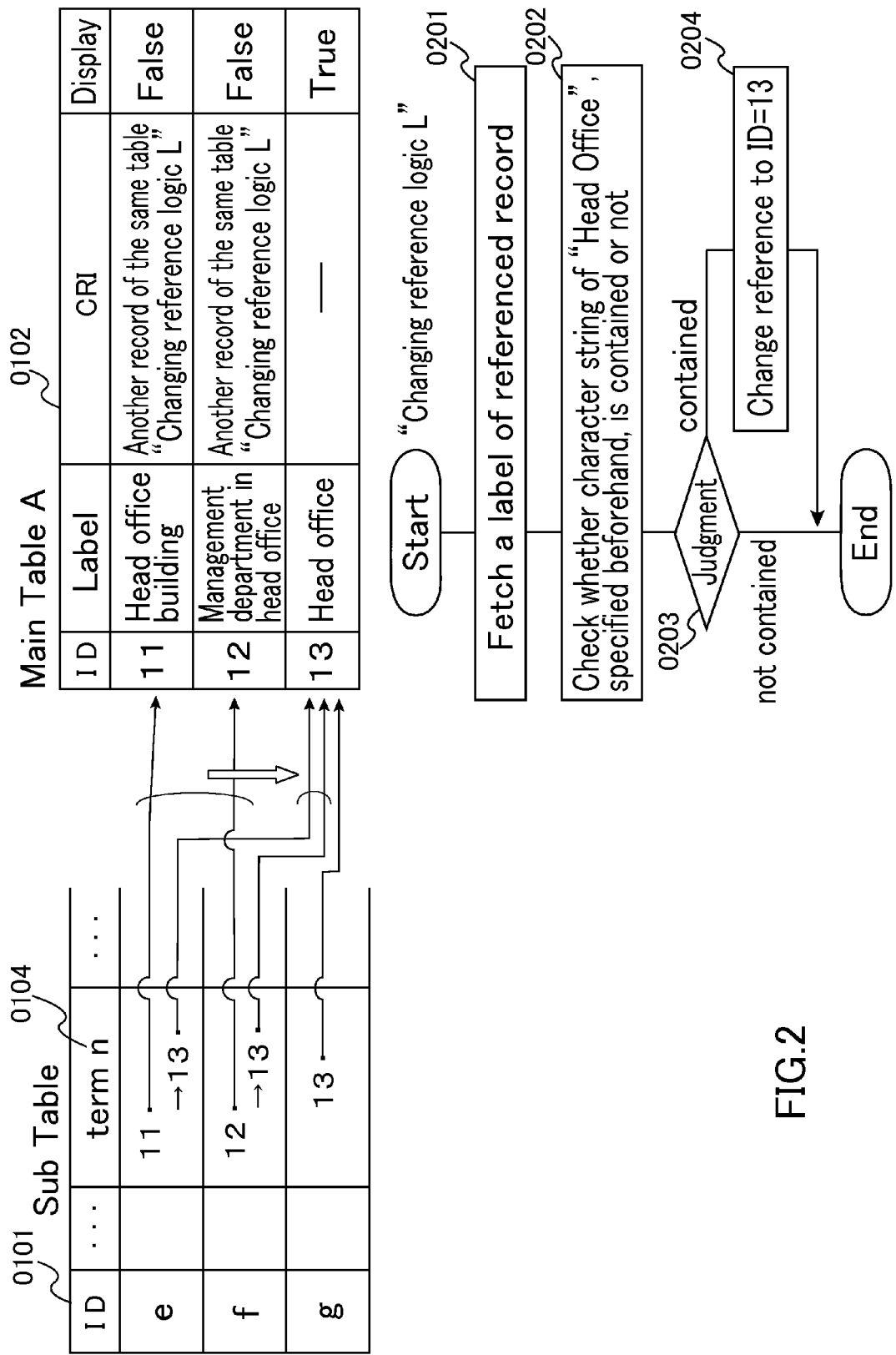
FIG. 2 shows changing reference by changing reference logic.

At the initial, record "ID=e" of a sub table 0101 of FIG. 2 refers to the record "ID=11" of main table A 0102. CRI of this record is "Another record of the same table" and "Changing reference logic L". Thus logic L is invoked. FIG. 2 shows a sample implementation of logic L as follows. First, fetch 0201 a label of the originally referenced record, that is "Head office building" in this example. Next, check 0202 whether label of the fetched label contains character string, specified beforehand, for example the "Head office", or not. If contained 0203, change 0204 reference of record with ID=e of sub table 0101 into reference to record of ID=13 of main table A 0102 that is specified beforehand. Record of ID=f of sub table 0101 is referring to record of ID=12 of main table A 0102 at the initial. Similarly, this reference will be changed to record of ID=13 of main table A 0102. Thus, all references to records of different expressions such as "Head office building", "Management department in head office" and "Head office" of same concept, are unified to references to a record of "Head Office".

Another implementation of logic L is logic to get ID of new table that is exactly same with ID of the old table. This logic is useful to convert a reference to old table to a new table with more records added to the tail of table. Another implementation of logic L is logic to get old ID+fixed value. This logic is useful to convert a reference to old table to a new table with more records added to the head of table.

<2.4 Reference Changing Tree>

Reference changing tree (RCT) is a tree structured information of changing reference, When CRI is "Node V of a RCT" (V is explanatory label of node), reference will be changed to a record specified by node V. If no record is specified with node V, search higher nodes of V in order, detect the first node with record, and use it as new referenced record.

Figure 3:
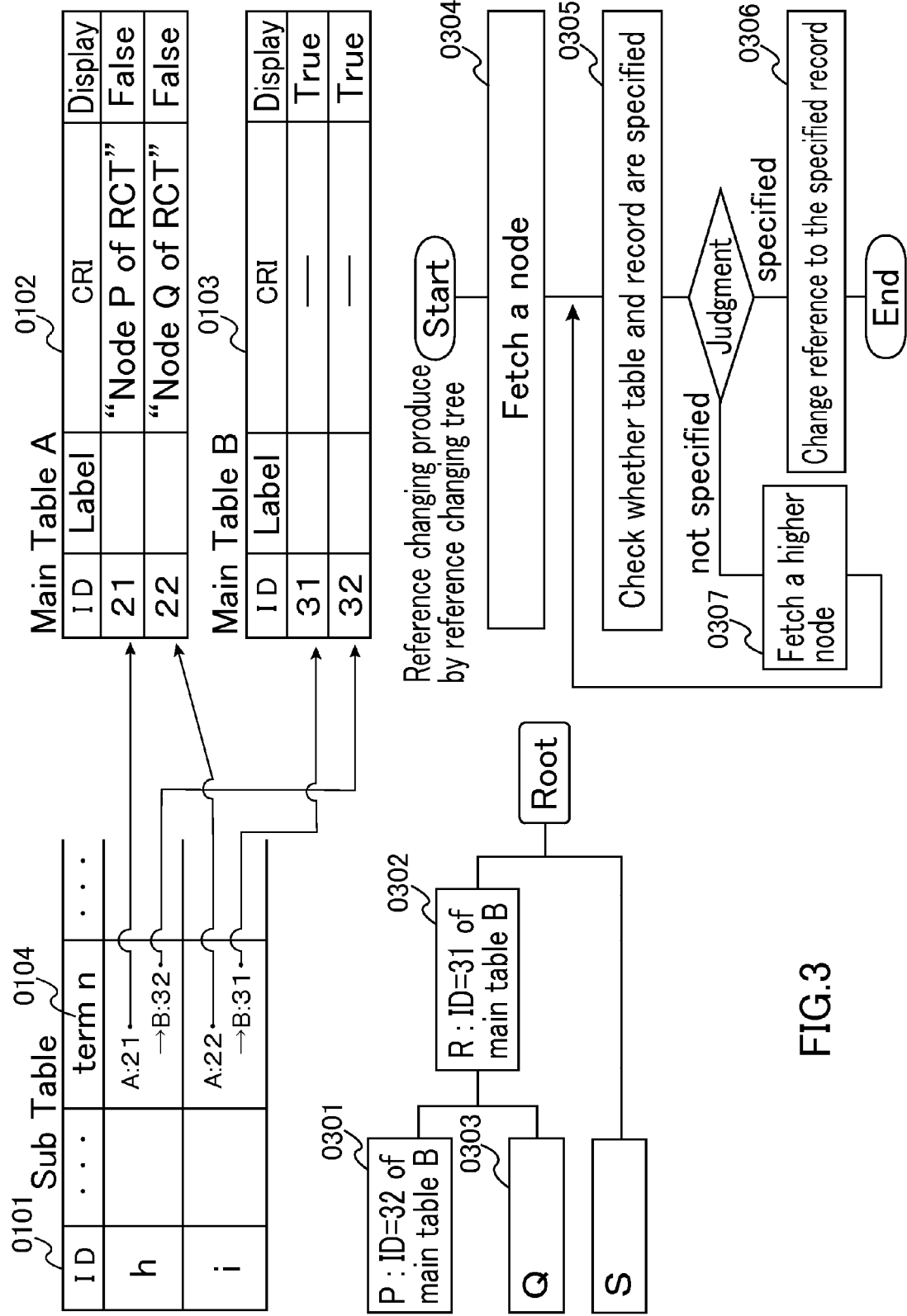
FIG. 3 shows changing reference by reference changing tree.

At the beginning, term n 0104 of record "ID=h" of sub table 0104 of FIG. 3 refers to the record with "ID=21" of main table A 0102. CRI of this record is "Node P of CRI". And, fetch 0304 node P 0301 and check 0305 whether table and record are specified at this node or not. Since "ID=32 of main table B" is specified, change 0306 the reference to the specified record.

At the beginning, term n 0104 of record "ID=i" of sub table 0101 refers to record "ID=22" of main table A 0102. CRI of this record is "node Q of RCT". And, fetch 0304 node Q 0303 and check 0305 whether table and record are specified at this node or not. Since node Q has no information, fetch 0307 higher node, that is node R 0302, and check 0305 whether table and record are specified at this node or not. Since there is "ID=31 of main table B", change 0306 the reference to the specified record.

It is good idea not to show records with CRIs to operators or user programs, for avoiding setting new reference to them. Only program for manipulating CRI and changing reference will access them. In FIG. 3, main table A 0102 is not displayed but only main table B 0103 that is the new main table will be displayed. Therefore, an operator cannot choose a record of main table A as a reference destination. In FIG. 2, records with ID=11 and 12 are not displayed (display=False) but only a record with ID=13 is displayed. That is, only "Head office" can be set as new reference destination. Records with CRI or property "Display=False" will be shown only for operators who manipulate them, of course.

Section 3

Multiple Reference Changes

If concurrent editing works to reproduced DBs are allowed, there is a possibility that plural CRI are registered to a single record. They are called as "piled CRIs". Method to treating them is explained below.

<3.1 Updating DB by Concurrent Editing Works>

PC will edit a working copy of its own reproduced DB that is not changed by this local editing work. These editing works can be done concurrently among PCs that have reproduced DBs of same origin. Editorial contents of each editing work, sometimes are or contains CRIs, are packed to a packet and assigned unique sequence number among all packets made by all PCs having reproduced DBs of same origin. Each PC receives these packets and uses them, in order of the assigned sequence number, to update their own reproduced DB.

If (1) the initial reproduced DBs are equal, (2) each reproduced DB is updated by same sequence of packets and (3) each update process and conflict resolution criteria are exactly same, then the updated reproduced DBs are equal. Even if packets are received asynchronously, reproduced DBs updated by same sequence of packets should be same. Contents of packets are evaluated as valid or not valid exactly same at every PC. When a packet is or contains a transaction, "commit" command is failed at every PC or succeed at every PC. There is no packet evaluated as valid at a PC and not valid at another PC. Section 4 describes details of them.

<3.2 Version and Base Version>

Version of reproduced DB is updated by completely same manner at each PC. For example, version is updated by all packets at each PC, or updated by only valid packets at each PC. The latter way is used for explanation in this description. Though it is natural to use natural number as a version, characters or any variables can be used if they can express sequence of editing works.

A packet can contain one or plural changes to a single record or plural changes to plural records. A packet also has a version number of reproduced DB just before the editing work was done. This version is called as "Base Version" that means version of reproduced DB that was the base of the editing work. Suppose that version number of reproduced DB is T for explanation, and a working DB is a copy of this reproduced DB. Then packet of editing work to this working DB has T as base version. It is also possible to set a mapping between a packet and a base version in a table or dictionary, instead of packet having base version number. Sometimes packet is or containing CRI, because making and setting CRI to a record is also an editing work. Simply saying, CRI has base version. It is possible to use these concepts (version and base version) to only one DB that is the original DB. This is a situation that one PC manipulate own DB. These concepts can be used to manage DB in a sequence of editing works.

Version T is also set to record X when consistency is checked and adjusted at reproduced DB of version T. This is called as "Record Version". For example, record X is set record version T when it is checked and reference is updated if CRI is set at reproduced DB of version T. Concepts of base version and record version are well described in PCT/JP2008/001424 that is assigned U.S. application Ser. No. 12/601,005, PCT/JP2008/001506, PCT/JP2009/002490 and PCT/JP2009/002491.

<3.3 Changing Reference by Piled CRIs>

Figure 4:
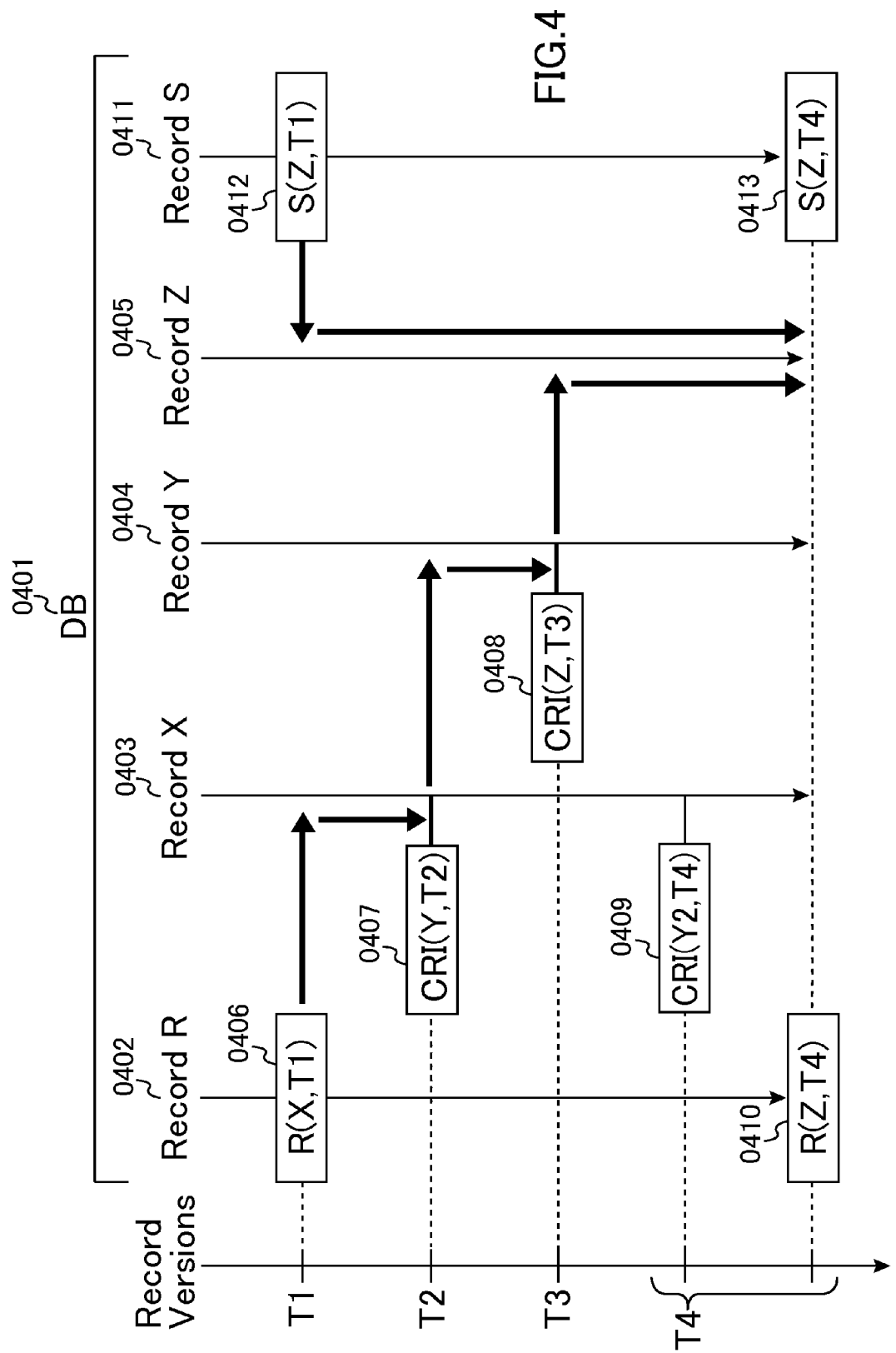
FIG. 4 shows changing reference by piled CRIs.

Plural CRIs of different base versions may be set to a single record. Here, we suppose that CRIs to same record at same base version will be detected as a conflict and only one CRI is selected as valid. CRIs of different base versions will be used to change a reference from that of with the earliest base version. FIG. 4 illustrates this mechanism, using the following notations:

CRI(X, T): This CRI indicates new referenced record X. This CRI was set at packet (editing work) with base version T.

R(X, T): Record R has a reference to record X, and has record version T.

As an example, we assume there is DB 0401 which is a reproduced DB or working DB or any other DB such as the original DB or single DB. Please note that it is possible to use CRI to a normal DB (not reproduced DB or working DB) for reducing peak processing burden of keeping the reference consistency at any time.

Initial situation of FIG. 4 is without R(Z, T4) 0410 and S(Z, T4) 0413. This DB was lastly updated to set CRI(Y2, T4) 0409. Now start to access record R 0402 of R(X, T1) 0406 indicating that reference from record R 0402 was already checked at DB of version T1. Checking reference to record X 0403, CRIs registered to X are investigated after T1 from the earliest. Even if there were CRIs registered to X before T1, they were already checked. CRI (Y, T2) 0407 registered to X is fetched. Checking reference to record Y 0404, CRIs registered to Y are investigated after T2 from the earliest. We assume that references from record X 0403 were already checked at DB of version T2 while attaching CRI(Y, T2) 0407 to record X. CRI(Z, T3) 0408 registered to record Y 0404 is fetched. Checking reference to Z 0405, CRIs registered to Z are investigated after T3 from the earliest. Because there are no further CRIs registered to record Z, the reference from record R 0402 is changed to record Z 0405. This is shown as R(Z, T4) 0410. Similarly start to access record S 0411 of S (Z, T1) 0412. Checking reference to record Z 0405, CRIs registered to Z are investigated after T1 from the earliest. Because there are no further CRIs registered to record Z, the reference from record S 0411 is changed to record Z 0405. This is shown as S(Z, T4) 0413.

There are two possible ways to treat changing reference as editorial contents. One way is changing reference by CRI is not packed to packet. This is good for reducing volume of packets. Another way is changing reference by CRI is packed to packet and propagated to other PCs. It can completely synchronizes reproduced DBs by packet sequences and R(Z, T4) 0410 and S(Z, T4) 0413 will be written to reproduced DB after receiving the packet.

Section 4

Parallel DB Editing

As described at Section 3.1, the present invention is also applicable for parallel DB editing. Packets of or containing CRIs can be exchanged among PCs that edit reproduced DBs from the origin.

<4.1 DB Operation by Server PC>

This section supposes that original DB is managed by server PC, and supposes that reproduced DBs, which are copies of whole or some part of original DB, are edited by plural terminal PCs. In this situation, every packet of editorial contents by terminal PCs can be checked by server PC. After that, only CRIs contained in or of valid packet are sent to each terminal PC.

<4.2 Distributed DB Operations>

Parallel editing work to a single DB is possible without using server of central managing. At the initial, each PC has a copy of whole or some part of the original DB. These copies are called as reproduced DBs. Packets of editorial contents are made for each reproduced DB individually. That is to say, PCs do editing works only to their own reproduced DBs concurrently. A packet of editorial contents is sent to other PCs. And PCs update their reproduced DB by these packets. These reproduced DBs will be synchronized each other by the following way that is discussed by PCT/JP2008/001506 and PCT/JP2009/002491.

(1) Packets are made without changing their reproduced DBs. Working DBs may be used for making packets.

(2) All packets made by all PCs are assigned unique sequence number.

(3) Each PC receives these packets with sequence number assigned.

(4) Each PC uses these packets to updates their reproduced DBs, by exactly same criteria and same order of packets with assigned sequence number.

<4.2.1 Simple Implementation>

Above (1) can be implemented as follows. Probably PC makes a working DB that is a copy of its own reproduced DB, and do editing work to the working DB. Difference between the reproduced DB and the working DB after the editing work will be a packet of editorial contents. As another way, we can use journals of editing work on the working DB to make a packet of editorial contents.

Figure 5:
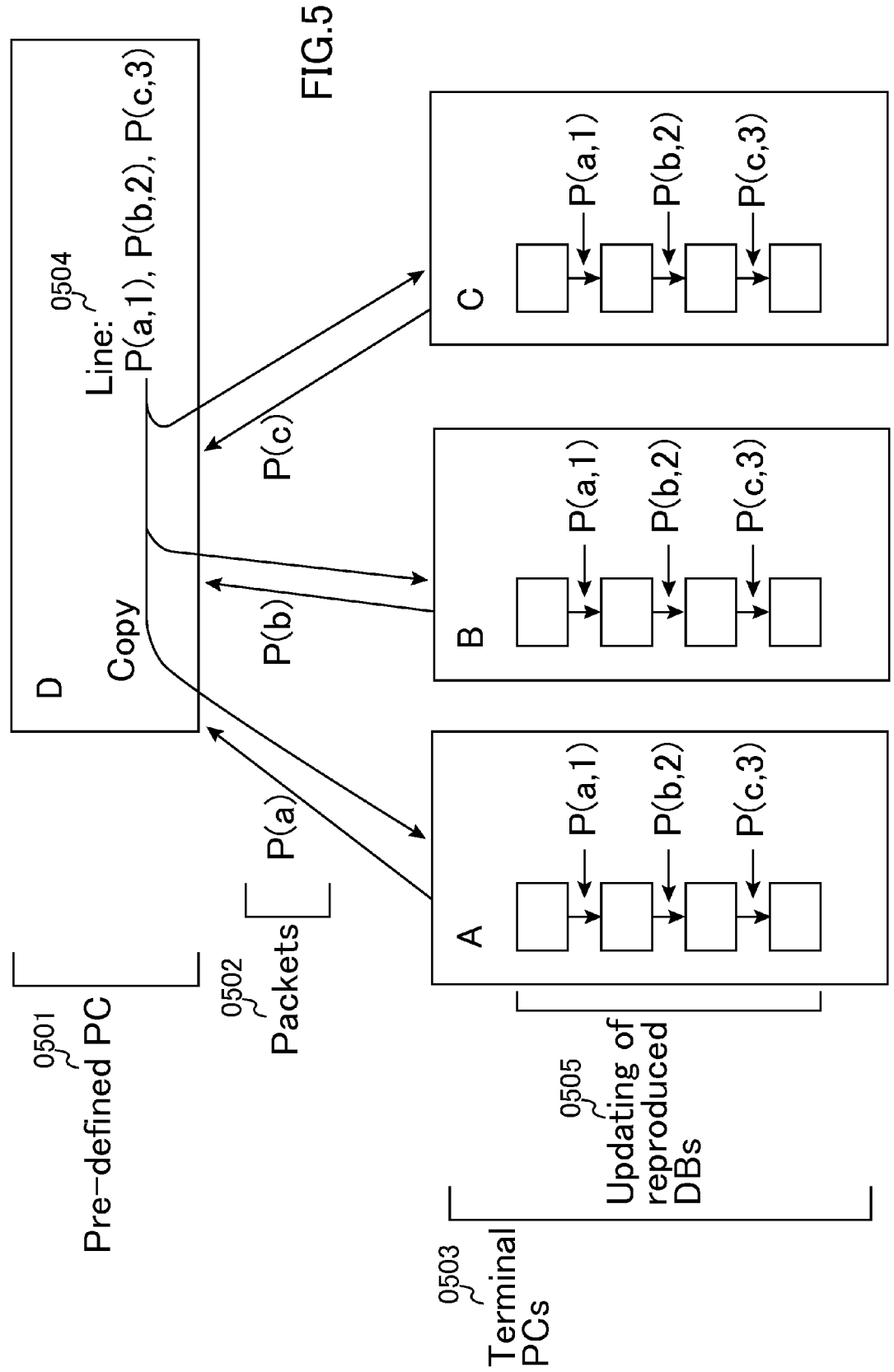
FIG. 5 shows parallel DB editing by distributed operations

Above (2) can be implemented as follows. All PCs send their packets to a pre-defined PC that assigns unique sequence number for every arriving packet as shown in FIG. 5. Suppose that there are terminal PCs 0503, which are A, B and C, and D as the pre-specified PC 0501. A, B and C makes packets 0502 P(a), P(b) and P(c) and send them to D. D assigns increasing natural number 1, 2 and 3 to them. This situation is explained as a line 0504 of P(a,1), P(b,2) and P(c,3).

Above (3) and (4) can be implemented as follows. If all terminal PCs 0503 receive all above packets P(a,1), P(b,2) and P(c,3) from D, and use them in order of assigned number to update 0505 reproduced DBs by procedure of same logic. Then resultant reproduced DBs are exactly equivalent, namely they have same contents. Any terminal PC can perform the role of the pre-defined PC. For example, one of terminal PCs 0505 such as A, can be also the pre-defined PC 0501.

<4.2.2 Synchronization by Packets>

There is a possibility that some PC receives only first part of the sequence (line 0504) of the packets and some others receive more packets. For example, suppose that A receives only P(a,1), B receives P(a,1) and P(b,2), and C receives P(a,1), P(b,2) and P(c,3). At this situation, these reproduced DBs are not same. But, when PC received the sequence of packets from first to same position and use them to update their reproduced DBs, they have exactly same contents. For example reproduced DBs updated by P(a,1) are exactly same, if the initial contents of these reproduced DBs are same. Reproduced DBs updated by P(a,1) and P(b,2) are exactly same. Similarly, reproduced DBs updated by P(a, 1), P(b,2) and P(c,3) are exactly same. Thus these reproduced DBs are synchronized by the packets.

<4.2.3 Other Implementations of Above (2)>

The pre-defined PC can assign sequence number that is not arrival order of packets. For example, it can assign earlier number to packets made by higher priority PC or packets containing higher priority data. As another example, pre-defined PC, that manages the sequence number, to which every PC asks unique sequence number for packets they created and assign them to packets.

<4.2.4 Other Implementations of Above (3)>

When packets are assigned unique numbers, it is possible to exchange packets among terminal PCs. There is no need to use the pre-defined PC so as to gather all packets.

<4.3 Resolving Collisions Among Packets>

<4.3.1 Collisions>

Before updating reproduced DB by above (4), PC resolves collisions among packets that are made by each PC without exchanging information. Modifications to same record by plural packets probably make collisions. If a group of records are closely and mutually related, packets modifying to these member records probably make collisions. It is possible to assign independent series of version numbers to such group and resolving collisions by these version numbers. This is equivalent to divide a DB to small parts.

<4.3.2 Resolving Collisions>

Version and base version shown at 3.2 can be used to resolve these collisions. If packets collide with each other, packet with later, that is newest, base version will be selected as a valid packet. The other packets are decided as invalid and will not be used to updates DB. It is a concept that decision based on the latest information is better than that base on old information. If there are packet of same base version, packet of earlier sequence number will be selected.

In case of Section 4.1 that server PC manages DB, sever PC will update DB only by valid packets. In case of Section 4.2 of "Distributed DB operation", each terminal PC will update its own reproduced DB only by valid packets. Resolving collisions by version and base version are discussed in PCT/JP/2008/001424 and PCT/JP2009/002490.

<4.4 Changing References>

Editing work to change reference will make a CRI and set it to old referenced record. Packet of this editing work will contains this CRI and information of the old referenced record. As a variation of implementation, CRI with information of the old referenced record can be a packet. Thus, CRIs are sent to other PCs and set to corresponding records. Finally procedures mentioned in Section 3 are used to change references in each reproduced DB.

Section 5

Program Structure

Figure 6:
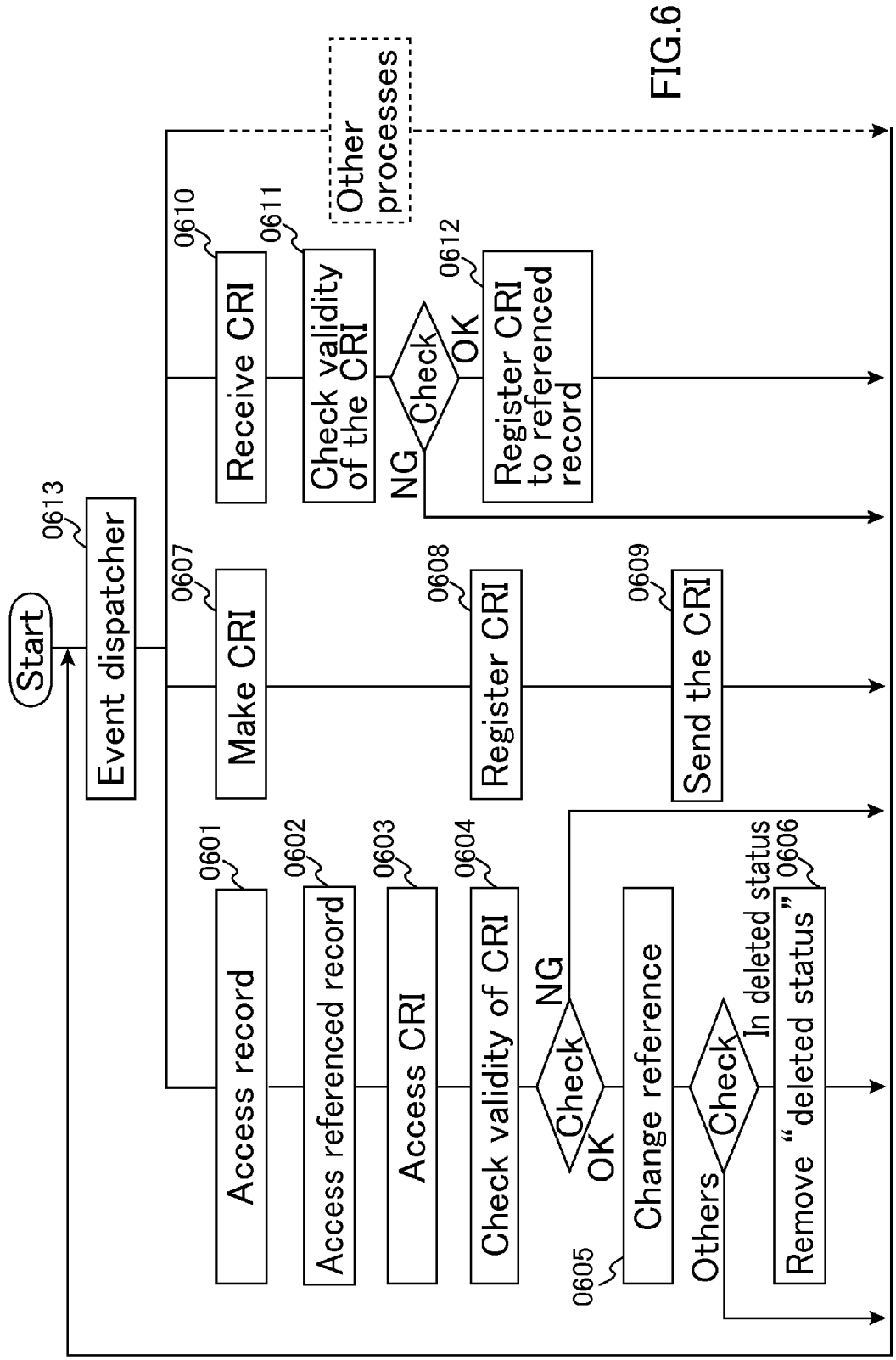
FIG. 6 shows program structure.

Methods of the present invention can be implemented as programs of programmable devices such as PC. FIG. 6 shows an example of a program structure. Every event is analyzed and corresponding process is invoked by event dispatcher 0613. For treating a record, first access 0601 record, access 0602 referenced record, access 0603 the registered CRI and check 0604 validity of the CRI. If this CRI is valid, change 0605 the reference. If the new referenced record is in deleted status, remove this deleted status 0606. If validity of CRI was already checked by "Check validity of the CRI" 0611 of updating process, there is no need to do "Check validity of CRI" 0604 at accessing the referenced record.

For changing a reference, first make 0607 CRI and register 0608 it to referenced record. Under the parallel DB editing, send 0609 the CRI to other PCs. After receiving 0610 CRI from other PC, check 0611 validity of this CRI. Valid CRI is registered 0612 to referenced record. There is no need to implement both "Check validity of the CRI" 0604 and "Check validity of the CRI" 0611. It is enough to implement one of them for each PC.

Process of changing reference is invoked when accessing old referenced record from the referencing record. However, it is possible to change plural references collectively when no higher priority processes are running.

Section 6

Apparatus

Figure 7:
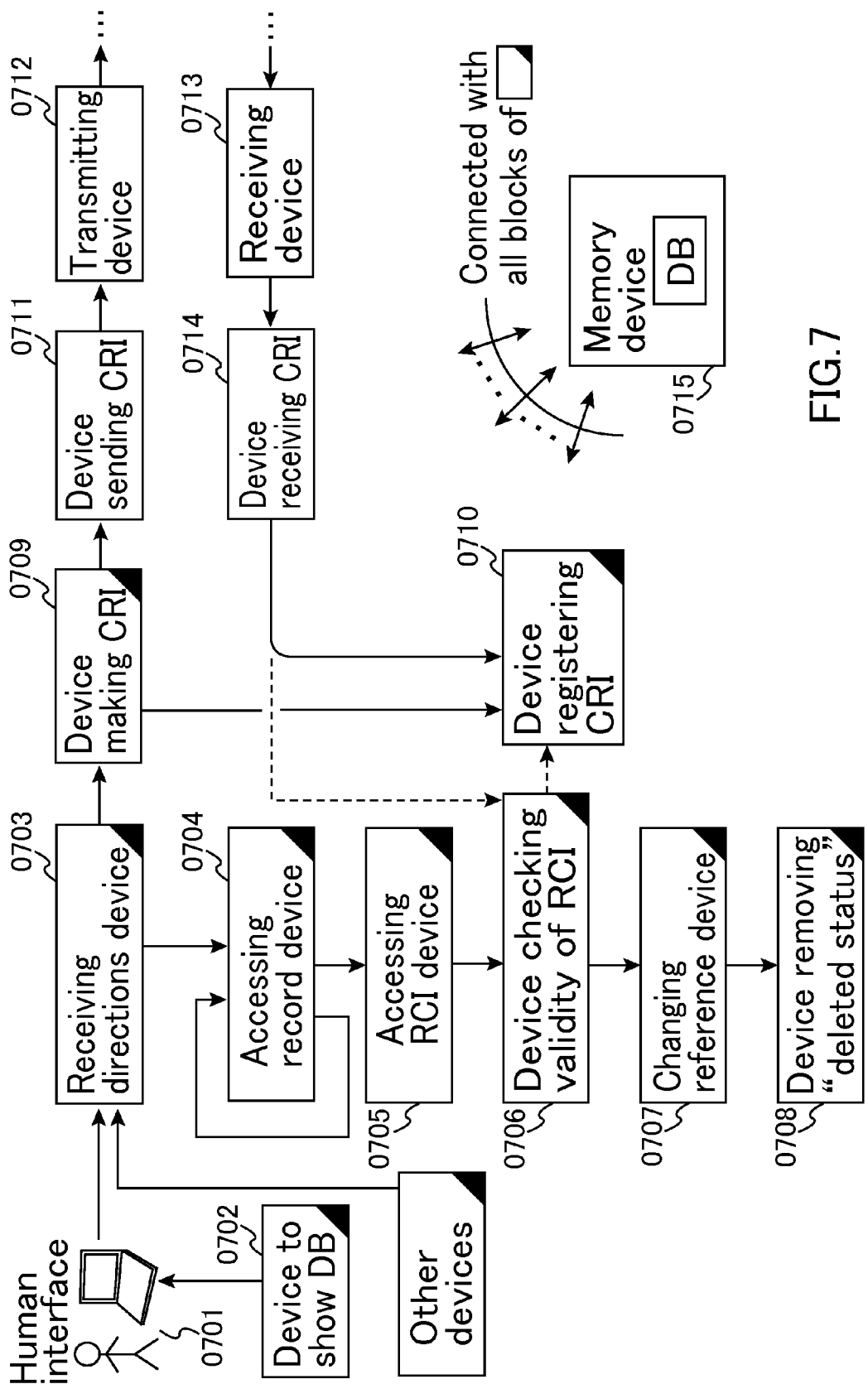
FIG. 7 shows apparatus structure.

The present invention can be implemented as an apparatus. FIG. 7 shows example of apparatus structure. Contents of DB are shown to human interface 0701 by "device to show DB" 0702. "Receiving directions device" 0703 checks signals from the human interface 0701 or other devices in FIG. 7 or devices not illustrated in FIG. 7. Memory device 0715 containing the DB is connected with devices marked black triangle of lower right corner of boxes in FIG. 7 and exchange signals between them.

Signals to check a record is passed to "Accessing record device" 0704. If this record refers other records, signals are sent to "Accessing record device" 0704 again. As for a referenced record, a signal is sent to "Accessing RCI device" 0705, a signal is sent to "Device checking validity of the RCI" 0706, and a signal is sent to "Changing reference device" 0707. If the new referenced record is in deleted status, a signal is sent to "Device removing deleted status" 0708.

Signal to change reference is passed to "Device making CRI" 0709, and a signal is send to "Device registering CRI" 0710. Furthermore, a signal is sent to "Device sending CRI" 0711, and a signal is sent to "Transmission device" 0712.

"Receiving device" 0713 send a signal to "Device receiving CRI" 0714, and a signal is sent to "Device registering CRI" 0710. Another implementation is that a signal from "Device receiving RCI" 0714 is sent to "Device checking validity of RCI" 0706 and a signal is sent to "Device registering CRI" 0710 as shown dotted lines in FIG. 7.

It is possible that some parts of this apparatus are implemented on devices of other apparatus that receives signal from other apparatus and send back resultant signal.

I claim:

1. A method for handling a database recorded on a recording medium, comprising the following sequence of steps:
   (Step-1) a step of accessing a referencing record, and accessing a reference that has been recorded to said referencing record,
   (Step-2) a step of accessing a referenced record that has been indicated by said reference,
   (Step-3) a step of accessing information that has been recorded to said referenced record, and keeps an order of changing said reference so as to indicate another record, and
   (Step-4) a step of changing said reference so as to indicate said another record, according to said information.

2. A method according to claim 1, in which if said another record of Step-4 has a flag showing that said another record should be treated as a deleted record, said flag is changed to show that said another record should be treated as a non-deleted record.

3. A method according to claim 1, in which
   validity of said information is judged according to a criteria that was given beforehand, and
   (Step-4) is performed if said information is valid.

4. A method according to claim 3, in which
   (Step-4) is repeated, as long as valid information is found.

5. A method according to claim 1, in which
   said another record is obtained by a logic specified by said information.

6. A method according to claim 1, in which,
   said information has been assigned to a node of a tree structure, and said information is used for the (Step-4),
   if said referenced record has been assigned to said node, or
   if said referenced record has been assigned to a higher node of said node, when said node does not have said information.

7. An apparatus for handling a database, comprising:
   a non-transitory recording medium holding said database that contains
     a reference that
       has been recorded to a referencing record, and indicates a referenced record, and
     information that
       has been recorded to said referenced record, and keeps an order of changing said reference so as to indicate another record, and
   a means of performing a process containing the following sequence of steps:
     (Step-1) a step of accessing said referencing record, and accessing said reference,
     (Step-2) a step of accessing said referenced record,
     (Step-3) a step of accessing said information, and
     (Step-4) a step of changing said reference according to said information, so as to indicate said another record.

8. An apparatus according to claim 7, further comprising a means of performing a procedure of setting information that keeps an order of changing
   a reference that has been recorded to a referencing record, so as to indicate another record
   to a referenced record that is indicated by said reference.

9. An apparatus according to claim 7, further comprising a means of performing a procedure comprising the following steps:
   (B-1) a step of receiving editorial contents to said database, and
   (B-2) a step of updating said database by said editorial contents.

* * * * *